W. SELKE.
APPARATUS FOR PLASTICALLY REPRODUCING AN OBJECT.
APPLICATION FILED SEPT. 28, 1914.

1,142,733.

Patented June 8, 1915.
2 SHEETS—SHEET 1.

W. SELKE.
APPARATUS FOR PLASTICALLY REPRODUCING AN OBJECT.
APPLICATION FILED SEPT. 28, 1914.

1,142,733.

Patented June 8, 1915.
2 SHEETS—SHEET 2.

 UNITED STATES PATENT OFFICE.

WILLY SELKE, OF BERLIN, GERMANY.

APPARATUS FOR PLASTICALLY REPRODUCING AN OBJECT.

1,142,733. Specification of Letters Patent. Patented June 8, 1915.

Application filed September 28, 1914. Serial No. 863,975.

*To all whom it may concern:*

Be it known that I, WILLY SELKE, a citizen of the German Empire, residing at Berlin, Germany, have invented a new and useful Apparatus for Plastically Reproducing an Object, of which the following is a specification.

The invention relates to a device for plastically reproducing an object with the aid of two stereoscopic photograms of the said object, lying in one and the same plane, the said device comprising an optical system adapted for observing the said photograms and means adapted for displacing the photograms and the optical system relatively to one another, for the purpose of directing the optical system on corresponding points of the photograms.

According to the present invention the device is fitted with two marks and two objectives, and illuminating means are provided, by which each objective forms an image of one of the marks on the modeling block. In addition to this means are provided for setting the direction of the lines connecting the optical centers of the objectives with their respective marks dependently on the relative setting of the photograms and the optical observing system in such a manner that the point of intersection of these connecting lines corresponds in each case to that point of the object, to the images of which on the two photograms the measuring marks of the optical observing system are set.

In a preferable constructional form of the invention two carriers are fitted so as to be rotatable about two relatively adjustable points. On each carrier one of the objectives and its mark are mounted in such a manner that the line connecting the optical center of the objective with the mark contains the center of rotation of the carrier at all positions of the latter. Preferably the illuminating device for each mark is also mounted on the respective carrier. Should the illuminating device contain a single source of light only, the latter may itself serve as the mark.

Figure 1:
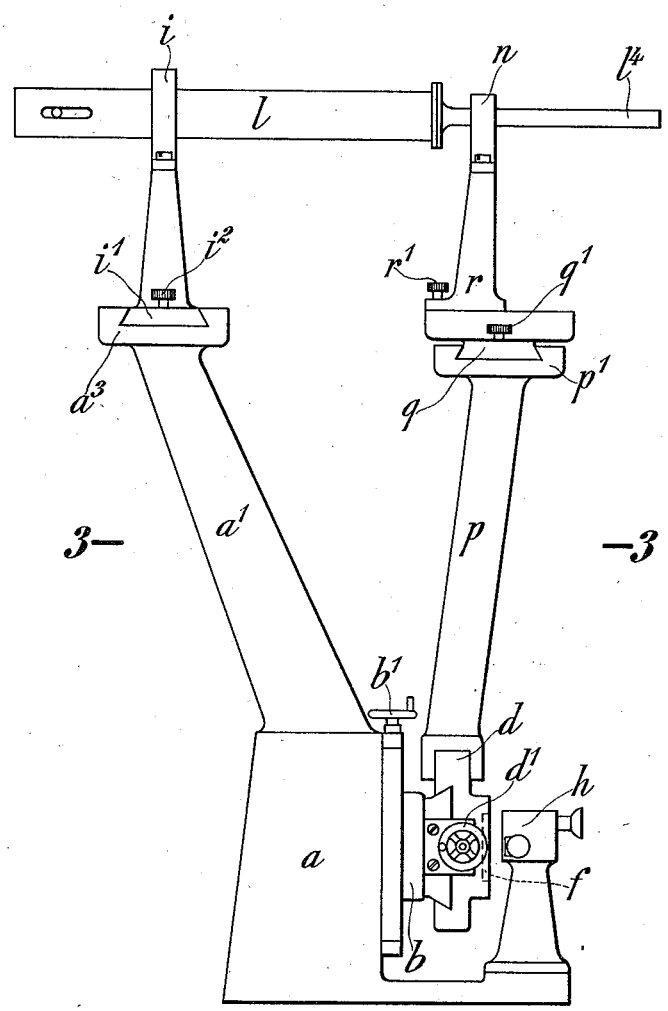
Figure 2:
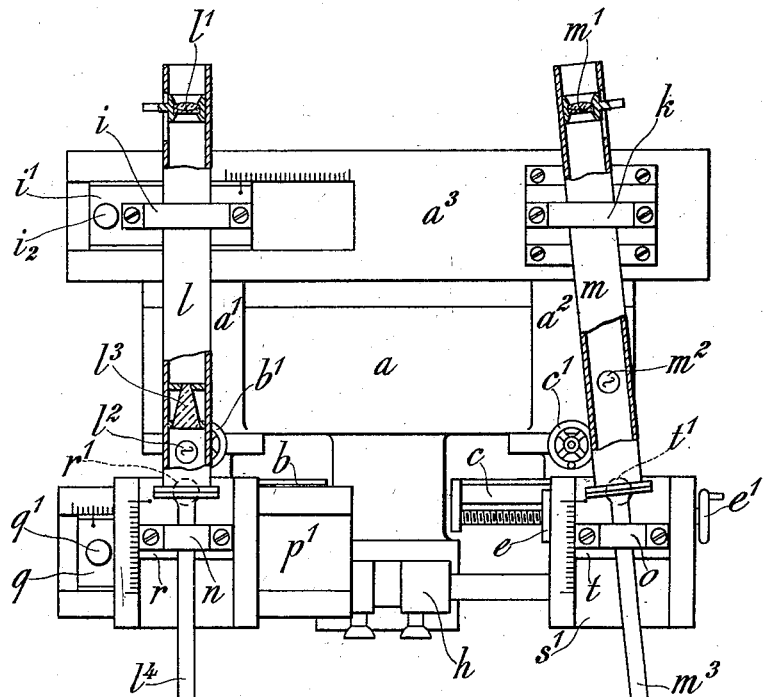
Figure 3:
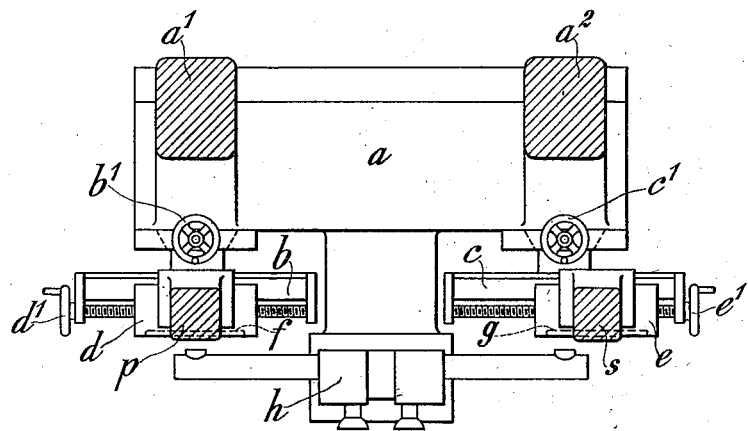

In the annexed drawing Figures 1 to 3 show a constructional example of the invention, Fig. 1 being a side elevation, Fig. 2 a plan view partly in section and Fig. 3 a cross-section on line 3—3 of Fig. 1.

On a support $a$ there are mounted two cross-slide systems, one of which comprises a vertically guided slide $b$ and a horizontally guided slide $d$ and the other of which comprises a vertically guided slide $c$ and a horizontally guided slide $e$. For actuating these slides there are provided the hand wheels $b^1$, $c^1$, $d^1$ and $e^1$. On each of the two horizontally displaceable slides $d$ and $e$ one of the photograms $f$ and $g$ is vertically disposed in such a manner that it is parallel to the direction of displacement of the said slide, the two photograms at the same time lying in one and the same plane. For observing the photograms a binocular double microscope $h$ is provided, which is fixed to the support $a$. Two ars $a^1$ and $a^2$ connect the support $a$ with a plate $a^3$, which acts as the carrier of the sockets $i$ and $k$ of two ball and socket joints, these sockets having such a relative disposition that the connecting line of the socket centers is horizontal and at the same time parallel to the plane of the photograms. While the socket $k$ is fixed directly to the plate $a^3$, the socket $i$ is disposed on an intermediate slide $i^1$, which is guided in such a manner that it can be set in a direction parallel to the connecting line of the socket centers. A clamping screw $i^2$ is provided for fixing the slide. In the sockets $i$ and $k$ there are rotatably journaled the tubes $l$ and $m$ respectively, each of which contains an objective $l^1$ and $m^1$ respectively, which is displaceable in the axial direction of the tube, and a lamp $l^2$ and $m^2$ respectively. In order to enhance the lighting effect, a glass cone $l^3$ is disposed in the tube $l$ in such a manner that it turns its greater base toward the lamp. Its smaller base represents the mark to be presented to the objective $l^1$. In the tube $m$ the lamp itself forms the mark. A second bearing is provided for the tube $l$ by means of a lengthening rod $l^4$ in a socket $n$, and for the tube $m$ by means of a lengthening rod $m^3$ in a socket $o$, the sockets $n$ and $o$ being connected to the slides $d$ and $e$ respectively in the following manner. To the slide $d$ there is fixed by means of an arm $p$ a plate $p^1$, on which is disposed a cross-slide system comprising two slides $q$ and $r$. The lower slide $q$ is guided on the plate $p^1$ in such a manner that it can be displaced in a horizontal direction and at the same time parallel to the plane of the photograms, a clamping screw $q^1$ being provided for fixing the slide to the plate, while the upper slide $r$ is displaceable in a direction perpendicular to the plane of the photograms and can be fixed by a clamping screw $r^1$ on the lower slide $q$. The upper slide $r$ forms the carrier for the socket $n$. To the slide $e$ is fixed by means of an arm $s$ a plate $s^1$, on which is disposed a slide $t$, which forms the carrier of the socket $o$ and is displaceable perpendicularly to the plane of the photograms. For fixing this slide on the plate $s^1$ a clamping screw $t^1$ is provided. The disposition is such, that on the one hand the connecting line of the centers of the ball and socket joints of each tube coincides with the axis of the ray pencil emerging from it, and that on the other hand the axes of the two ray pencils lie in one and the same horizontal plane and are at the same time directed perpendicularly to the plane of the photograms, when the slides $b$, $c$, $d$ and $e$ occupy such a position that the two image points on the photograms corresponding to the axial rays are presented as coinciding with the measuring marks of the binocular double microscope $h$.

The operation of the device is as follows. The tube $l$ should be displaced by means of the slides $i^1$ and $q$, until there is indicated on the scales alongside the guides of these slides a value, which corresponds to the length of the base-line. In this position the slides should be fixed by means of the clamping screws $i^2$ and $q^1$. Thereupon the distance between the ball and socket joints $i$ and $n$ and the distance between the ball and socket joints $k$ and $o$ should be adjusted by displacing the slides $r$ and $t$ so as to correspond to the width of picture, after which the clamping screws $r^1$ and $t^1$ of these slides should be tightened. If the base-line and the width of picture be chosen of the same size as those used, when the photograms were taken, a body will result from the copying process, which is exactly similar to the original one. In order that a particular object-point may be copied, the photograms must be set by means of the slides $b$ and $d$ and the slides $c$ and $e$ respectively in such a manner that the two image-points of the said object-point are seen as coinciding with the measuring marks of the binocular double microscope $h$. This causes the two tubes $l$ and $m$ to be rotated in the sockets $i$ and $k$ respectively in such a manner that the axes of the ray pencils emerging from them intersect in a point corresponding to the said object-point. The modeling block, which is placed in front of the tubes $l$ and $m$, must then be treated by material being removed from or added to it, until the said point of intersection becomes visible, which is the case, when the images of the marks disposed in the two tubes coincide. The sharp focusing of these mark-images is effected by displacing the objectives $l^1$ and $m^1$ in the direction of the respective tube-axes.

Devices for the plastic reproduction of an object have been frequently suggested. For instance, in the British patent specification 9190 of the year 1912 such a device is described, in which, however, two aiming or sighting devices serve for finding the object-points, the position of an object-point being determined by the point of intersection of the sighting lines presented by the said device. Another device of this type has become known through the United States patent specification 1090493. In this case the relative movement of the photograms and the optical observing system is transmitted by a system of levers to the modeling tool. The British patent specification 28673 of the year 1913 also describes a constructional form of such a device. In this case a mark combined with a copying tool is provided, images of which mark are formed by means of an illuminating device and two objectives on the two photograms. In this device, therefore, the course of the rays of light is oppositely directed to that in a device corresponding to the present invention. Such an arrangement entails the disadvantage, that a special copying system must be provided, in which the copying tool and the copy carrier are connected together for relative movement in space. A process for the plastic reproduction of an object is described in the United States patent specification 891013. This process consists in projecting two images of the object, which are provided with a set of markings, simultaneously on a modeling block. In this process the modeler sees the images of the object, which are projected onto the modeling block together with the sets of markings, in their entirety, so that it is not easy for him to comprehend corresponding points of these images, and that it is impossible for him to set the device for any conspicuous points of the object.

I claim:

1. In an apparatus for plastically reproducing an object with the aid of two stereoscopic photograms of the said object, lying in one and the same plane, an optical system for observing the said photograms, means adapted to move the said photograms and the said system relatively to one another, for directing the said system on corresponding points of the said photograms, two marks, two objectives adapted each to form an image of one such mark, illuminating means adapted to present each of the said marks to its objective and other means adapted to cause the relative movement of the photograms and the optical system to change the direction of the lines connecting the optical centers of the objectives with their respective marks.

2. In an apparatus for plastically reproducing an object with the aid of two stereoscopic photograms of the said object, lying in one and the same plane, an optical system for observing the said photograms, means adapted to move the said photograms and the said system relatively to one another, for directing the said system on corresponding points of the said photograms, two marks, two objectives adapted each to form an image of one such mark, two carriers, which are rotatable about two relatively adjustable points and are each adapted to carry one such objective and its mark, each objective and its mark being fitted to the corresponding carrier in such a manner that the connecting line between the optical center of the objective and its mark contains the center of rotation of the carrier at all positions of the latter, illuminating means adapted to present each of the said marks to its objective and other means adapted to cause the relative movement of the photograms and the optical system to change the direction of the said connecting lines.

WILLY SELKE.

Witnesses:
HENRY HASPER,
WOLDEMAR HAUPT.